United States Patent
Zhang et al.

(10) Patent No.: US 11,818,197 B2
(45) Date of Patent: Nov. 14, 2023

(54) DATA STREAM MANAGEMENT METHOD AND DEVICE

(71) Applicant: SAMSUNG ELECTRONICS CO., LTD., Suwon-si (KR)

(72) Inventors: Yuqi Zhang, Suwon-si (KR); Zhonggang Chen, Suwon-si (KR); Ni Xue, Suwon-si (KR)

(73) Assignee: Samsung Electronics Co., Ltd.

( * ) Notice: Subject to any disclaimer, the term of this patent is extended or adjusted under 35 U.S.C. 154(b) by 10 days.

(21) Appl. No.: 17/152,861

(22) Filed: Jan. 20, 2021

(65) Prior Publication Data

US 2022/0094738 A1    Mar. 24, 2022

(30) Foreign Application Priority Data

Sep. 23, 2020    (CN) .......................... 202011009137.5

(51) Int. Cl.
    *H04L 67/06*    (2022.01)
    *G06F 16/17*    (2019.01)
    *H04L 67/1097*    (2022.01)

(52) U.S. Cl.
    CPC .......... *H04L 67/06* (2013.01); *G06F 16/1734* (2019.01); *H04L 67/1097* (2013.01)

(58) Field of Classification Search
    CPC .. H04L 67/06; H04L 67/1097; G06F 16/1734
    USPC ....................................................... 709/221
    See application file for complete search history.

(56) References Cited

U.S. PATENT DOCUMENTS

| | | | |
|---|---|---|---|
| 6,981,116 B2 | 12/2005 | Jolly | |
| 7,509,673 B2 | 3/2009 | Swander et al. | |
| 9,256,606 B2 | 2/2016 | Attarde et al. | |
| 9,256,640 B2 | 2/2016 | Branson et al. | |
| 9,549,011 B2 | 1/2017 | Wogsberg et al. | |
| 2005/0289139 A1* | 12/2005 | Takashima ....... | G11B 20/00536 707/999.005 |
| 2017/0228157 A1 | 8/2017 | Yang et al. | |
| 2020/0249990 A1* | 8/2020 | Barsness ............. | G06F 16/2282 |

OTHER PUBLICATIONS

Yang, J. et al. AutoStream: Automatic Stream Management for Multi-streamed SSDs. SYSTOR (2017).
Rho, E. et al. FStream: Managing Flash Streams in the File System. FAST (2018).
Yang, P. et al. Reducing Garbage Collection Overhead in SSD Based on Workload Prediction. HotStorage (2019).
Kim, T. et al. Fully Automatic Stream Management for Multi-Streamed SSDs Using Program Contexts. FAST (2019).

* cited by examiner

*Primary Examiner* — David R Lazaro
*Assistant Examiner* — Zia Khurshid
(74) *Attorney, Agent, or Firm* — Fish & Richardson P.C.

(57) ABSTRACT

A method for managing a data stream includes obtaining attribute information of a currently opened file; and distributing the file to a data stream according to current state information of a plurality of data streams and attribute information of the file.

17 Claims, 5 Drawing Sheets

```
Acquire attribute information of a          S110
currently opened file
                    |
                    v
Distribute the file to a data stream        S120
according to current state information
of data streams and the attribute
information of the file
```

DATA STREAM MANAGEMENT METHOD AND DEVICE

CROSS-REFERENCE TO RELATED APPLICATION

This U.S. nonprovisional patent application claims the benefit of priority under 35 U.S.C. § 119 to Chinese Patent Application No. 202011009137.5, filed on Sep. 23, 2020 in the Chinese Patent Office, the disclosure of which is incorporated herein in its entirety by reference.

BACKGROUND

Technical Field

The inventive concept(s) described herein relate to a technical field of data memory, and more specifically, relate to a data stream management method, a storage device that operates according to a data stream management method, and a data stream management device.

Background Art

In order to improve performance of a memory, it is generally necessary to effectively distribute written data. As an example, movement of valid pages in garbage collection (GC) is greatly reduced if the written data can be effectively distributed and data with similar life cycles are stored in a same block of the memory. As a result, a write amplification factor (WAF) may be reduced, and working life of the memory may be greatly increased and memory performance may be improved.

Existing methods for distributing data typically require modifications to an operating system kernel and/or code of an application. For example, some methods of data distribution involve distributing data based on access characteristics of a logical block address. The process of collecting the access characteristics information of the logical block address requires modifications to driver layer code of the operating system kernel. Some methods of data distribution involve distributing the data based on program context information and the process of collecting the program context information requires modifications to code of the operating system kernel and code of some applications. Some methods of data distribution involve requiring modifications to code of a file system layer of the operating system kernel, as well as human involvement.

SUMMARY

The exemplary embodiments described herein provide a data stream management method and device.

According to an aspect of the present disclosure, a data stream management method includes obtaining attribute information of a currently opened file; and distributing the file to a data stream according to current state information of data streams and the attribute information of the file.

According to another aspect of the present disclosure, a data stream management device is provided, including a file monitoring module configured to obtain attribute information of a currently opened file and a stream management module configured to distribute the file to a data stream according to current state information of data streams and the attribute information of the file.

According to another aspect of the present disclosure, a storage device includes a memory and a data stream management device. The memory is configured to store written data logically arranged in accordance with a plurality of data streams. The data stream management device is configured to obtain attribute information of a currently opened file, and to distribute the file to a data stream according to current state information of the plurality of data streams and the attribute information of the file.

BRIEF DESCRIPTION OF THE DRAWINGS

The purposes, features and advantages of the exemplary embodiments will be more clearly understood, from the following detailed description taken in conjunction with the accompanying drawings that exemplarily illustrate the embodiments.

DETAILED DESCRIPTION

The following description with reference to the accompanying drawings is provided to assist in help a comprehensive understanding of the embodiments defined by the claims and their equivalents. Various specific details are included to help understanding, but these details are only to be regarded as exemplary. Therefore, those of ordinary skill in the art will recognize that various changes and modifications can be made to the embodiments described herein without departing from the scope and spirit of the present disclosure. In addition, for clarity and conciseness, descriptions of well-known functions and structures are omitted.

Figure 1:
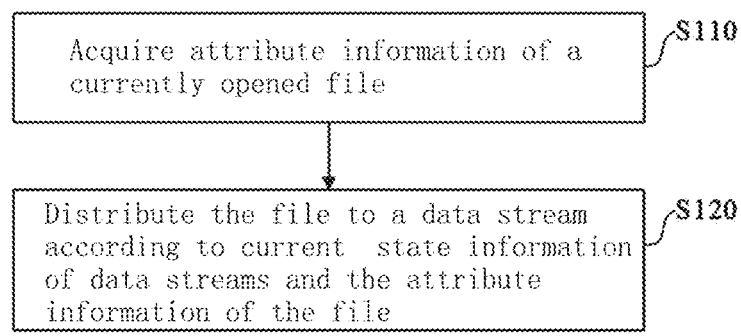
FIG. 1 illustrates a flowchart of a data stream management method according to an exemplary embodiment.

FIG. 1 illustrates a flowchart of a data stream management method according to an exemplary embodiment of the present invention.

Figure 6:
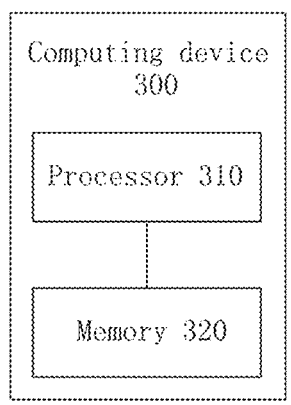
FIG. 6 illustrates a block diagram of a computing device according to an exemplary embodiment.

Referring to FIG. 1, in step S110, attribute information of a currently opened file is obtained. Opened files are files that may be operated by applications deployed in an operating system of an electronic device (such as a computer). Taking a database file as an example, the database file may be operated by MySQL, PostgreSQL, Cassandra, RocksDB, MongoDB, or Docker, etc. deployed in the operating system of the electronic device. Of course, the opened file may also be another type of an electronic file, and the present disclosure is not specifically limited to the type of the file noted in exemplary embodiments. The opened file may include data already written to, to be written to, already read from, or to be read from a storage device of the electronic device (such as a computer) or connected to the electronic device. An example of a storage device is a solid state drive (SSD). The data stream management method of FIG. 1 may be performed partially or entirely by a controller in the electronic device (such as a computer) or a controller in a storage device (such as an SSD) which is separate from and connected to the electronic device. Furthermore, an example of a controller is illustrated in the embodiment of FIG. 6 below, with a memory 320 that stores instructions and a processor 310 that executes the instructions to perform some or all aspects of methods described herein including the method of FIG. 1.

The attribute information of the file may include information related to operations such as creation, opening, modification, closing, deletion and the like of the currently opened file. Taking a certain database file as an example, the attributes of the database file may include:

IN_ACCESS/*File was accessed*/, representing that the file was accessed

IN_MODIFY/*File was modified*/, representing that the file was modified

IN_ATTRIB/*Metadata changed*/, representing that the metadata was changed

IN_CLOSE_WRITE/*Writable file was closed*/, representing that the writable file was closed IN_CLOSE_NOWRITE/*Unwritable file closed*/, representing that the unwritable file was closed IN_OPEN/*File was opened*/, representing that the file was opened IN_MOVED_FROM/*File was moved from X*/, representing that the file was moved from IN_MOVED_TO/*File was moved to Y*/, representing that the file was moved to IN_CREATE/*Subfile was created*/, representing that the subfile was created IN_DELETE/*Subfile was deleted*/, representing that the subfile was deleted IN_DELETE_SELF/*Self was deleted*/, representing self-deleting, that is, one executable file deleted itself during execution IN_MOVE_SELF/*Self was moved*/ representing self-moving, that is, one executable file moved itself during execution Alternatively, the acquired attribute information may specifically include a number of occurrences, a word length, or time of the attribute of the currently opened file. For example, the acquired attribute information may include a number of times of the file being accessed, the word length of the file being modified, the time of the file being created, etc.

Each file corresponds to one inode (index node) in virtual file system of the operating system kernel, and the inode stores the attribute information of the file. In step S110, the attribute information of the currently opened file may be obtained by monitoring inodes in the virtual file system by calling tools corresponding to the operating system kernel. Taking the Linux system as an example, the attribute information of the file may be obtained from Inodes by calling tools such as inotify provided by the Linux kernel. It may be understood that the attribute information of the file may also be obtained from the inode in other ways, and the present disclosure is not limited to the specific way of acquiring the attribute information of the file described for exemplary embodiments.

Alternatively, the acquired attribute information of the currently opened file may be stored in the file attribute table. Since the inode number corresponds to the file one-to-one, in the file attribute table, each inode number may be used as a number of corresponding file, and attribute information of each file is recorded under the inode number corresponding to the file.

As an example, a format of the file attribute table may be as shown in Table 1. In Table 1, the inode numbers corresponding to multiple files are recorded in the first row (such as Inode 1, Inode 2, and Inode 3, etc.), and multiple attribute types of the files are recorded in the first column (such as access and modify, etc.). A column under each inode number records attribute information of corresponding attribute (the number of occurrences, the word length or the time, etc.) respectively. For example, "200" recorded in the first cell under Inode 1 means that the file corresponding to Inode 1 has been accessed 200 times.

Data streams may be streams of data opened in a memory device such as an SSD, and may be identified by data stream identifiers. For example, a host system may open data streams in the SSD and distribute data for writing to the SSD via write requests allocated to specified streams. Use of data streams may help ensure that data in a particular data stream is written together to a physically related NAND flash space such as a NAND flash block or "erase unit", and also that the data in a particular data stream is also separated from data in other data streams. After data stream distribution for files is completed by distributing files to specified data streams, identifiers of the specific data streams to which the files are distributed may also be recorded in the file attribute table.

TABLE 1

| event type | Inode 1 | Inode 2 | Inode 3 | Inode 4 | Inode 5 | Inode 6 | Inode 7 | Inode 8 |
| --- | --- | --- | --- | --- | --- | --- | --- | --- |
| access | 200 | 100 | 112 | 130 | 130 | 112 | 88 | 96 |
| modify | 130 | 130 | 130 | 130 | 130 | 130 | 130 | 130 |
| metadata change | 50 | 0 | 13 | 21 | 5 | 53 | 11 | 32 |
| close write | 6 | 21 | 160 | 13 | 64 | 13 | 23 | 6 |
| close nowriete | 4 | 47 | 14 | 2 | 3 | 8 | 11 | 28 |
| open | 20 | 13 | 33 | 25 | 65 | 22 | 14 | 5 |
| moved from | 45 | 20 | 71 | 34 | 27 | 2 | 9 | 8 |
| moved to | 53 | 5 | 13 | 2 | 8 | 7 | 21 | 34 |
| create | 49 | 20 | 120 | 35 | 56 | 21 | 8 | 6 |
| delete | 35 | 13 | 100 | 100 | 20 | 33 | 78 | 63 |
| delete self | 8 | 25 | 9 | 5 | 14 | 9 | 7 | 1 |
| move self | 5 | 44 | 13 | 47 | 68 | 45 | 53 | 2 |
| file type | log | log | ibd | sst | log | ibd | sst | ibd |
| file size | 13 | 25 | 120 | 5 | 45 | 9 | 7 | 1 |
| stream ID | 1 | 4 | 3 | 7 | 8 | 5 | 8 | 5 |
| access | 200 | 100 | 112 | 130 | 130 | 112 | 88 | 96 |
| modify | 130 | 130 | 180 | 180 | 130 | 130 | 130 | 130 |
| metadata change | 50 | 0 | 13 | 21 | 5 | 53 | 11 | 32 |
| close write | 6 | 0 | 160 | 0 | 64 | 0 | 23 | 6 |
| close nowriete | 0 | 0 | 0 | 0 | 0 | 0 | 0 | 0 |
| open | 20 | 13 | 33 | 25 | 65 | 22 | 14 | 5 |

TABLE 1-continued

| event type | Inode 1 | Inode 2 | Inode 3 | Inode 4 | Inode 5 | Inode 6 | Inode 7 | Inode 8 |
|---|---|---|---|---|---|---|---|---|
| moved from | 45 | 20 | 71 | 34 | 27 | 2 | 9 | 3 |
| moved to | 53 | 0 | 13 | 2 | 8 | 7 | 21 | 34 |
| create | 49 | 20 | 120 | 36 | 56 | 21 | 3 | 6 |
| delete | 0 | 13 | 100 | 100 | 20 | 33 | 78 | 63 |
| delete self | 0 | 25 | 0 | 5 | 0 | 9 | 7 | 1 |
| move self | 0 | 44 | 13 | 47 | 68 | 45 | 0 | 2 |
| file type | MySQL | Docker | RocksDB | MySQL | RocksDB | RocksDB | Docker | MySQL |
| file size | 13 | 25 | 120 | 5 | 46 | 9 | 7 | 1 |
| stream ID | 1 | 4 | 3 | 7 | 8 | 5 | 8 | 6 |

In Table 1, a row of 'access' indicates that a number of times which a file is accessed; a row of 'modify' indicates that a number of times which a file is modified; a row of 'metadata change' indicates that a number of times which metadata is modified; a row of 'close write' indicates that a time when a writable file is closed; a row of 'closed nowrite' indicates that a time when a unwritable file is closed; a row of 'open' indicates that a time when the file is opened; a row of 'moved from' indicates that a time when a file is moved from; a row of 'moved to' indicates that a time when a file is moved to; a row of 'create' indicates that a time when a new file is created; a row of 'deleted' indicates that a time when a file is deleted; a row of 'deleted self' indicates that a time when it is self-deleted, that is, a time when one executable file deletes itself when executed; a row of 'move self' indicates that a time when it is self-moved, that is, a time when one executable file moves itself during execution; a row of 'file type' indicates a type of a file; a row of 'file size' indicates a size of a file; a row of 'stream ID' indicates an identifier of a data stream to which a file is distributed.

Alternatively, in step S110, it may start to obtain the attribute information of the file continuously while the file is opened. The duration of obtaining the attribute information of the file may be determined depending on actual design needs. For example, the duration may be within 10 seconds, within 50 seconds, or within 1 hour, etc., after the file is opened, and the duration may also be the time elapsed from the opening of the file to the closing of the file. It may be understood that the attribute information of the file may change during this duration. When the attribute information of the file changes, these changed attribute information may be obtained, and these changed attribute information may also be updated to the file attribute table.

In step S120, the file is distributed to data streams, according to current state information of data streams and the attribute information of the file.

Corresponding relationships between the data streams and the file are determined, according to the current state information of the data streams and the attribute information of the file, so that the file is distributed to corresponding data stream.

Under normal workloads, data is managed in the form of file, based on this characteristic of the data, the data stream management method proposed by the exemplary embodiment automatically distributes each file to corresponding data stream based on the attribute information of the file, the attribute information of the file may be directly acquired in a virtual file system of an operating system kernel, that is, it does not need to modify code of the operating system kernel, and it does not need to modify code of an application for modification, thereby reducing the effect on the operating system kernel and application. And the data stream management method can also effectively realize the separation of data of different cycles.

It may be understood that the attribute information of the file may change during an entire cycle from the opening to the closing of the file. Exemplary embodiments may perform data stream distribution for the file one or more times based on the initial attribute information of the file, the changed attribute information, etc., so as to ensure that the result of data stream distribution is more rational. Thereafter, a method of distributing a file to a data stream is described.

Alternatively, the attribute information of the file includes a type of the file, step S110 may include: the attribute information of the file is obtained immediately when the file is opened, and step S120 may include: when the file is opened, the file is distributed to a data stream of which current state satisfies a first preset condition according to the current state information of the data streams and the type of the file.

It may be understood that writing has not occurred when the file is just opened, the attribute information that may be extracted from the file is limited, and the acquired attribute information of the file is less. Generally speaking, the type and opening time of the file may be acquired when the file is just opened.

The data stream management method proposed by the exemplary embodiment may complete data stream distribution for the file once immediately when the file is opened, and may ensure optimization effect of the data stream distribution in time.

Alternatively, the current state information of the data streams includes at least one of the type of files which are currently distributed to the data streams; a number of files which are currently distributed to the data streams; and opening duration information of files which are currently distributed to the data streams; a number of times by which files which are currently distributed to the data streams are modified. An example of opening duration information is information of how long each file has been open.

It should be noted here that the opening duration of a file refers to a time period elapsed from a moment that the file is opened to a current moment.

Using the type of the files which are currently distributed to the data streams as a basis for the data stream distribution may increase a probability that files of the same type are distributed to one data stream. Using the opening durations of the files which are currently distributed to the data streams, the number of the files which are currently distributed to the data streams and the number of times by which the files which are currently distributed to the data streams are modified as the basis for the data stream distribution may balance data volumes of respective data streams, so that the data volumes of respective data streams remain consistent to a large extent.

Alternatively, the open duration information of the files which are currently distributed to the data streams includes at least one of average opening duration of all files which are currently distributed to the data streams; total opening duration of all files which are currently distributed to the data streams.

It should be noted that the average opening duration of all files which are currently distributed to the data streams refers to the average value of the opening durations of all files which are currently distributed to the data streams at the current moment. The total opening duration of all files which are currently distributed to the data streams refers to a sum value of the opening durations of all files which are currently distributed to the data streams at the current moment.

Figure 2:
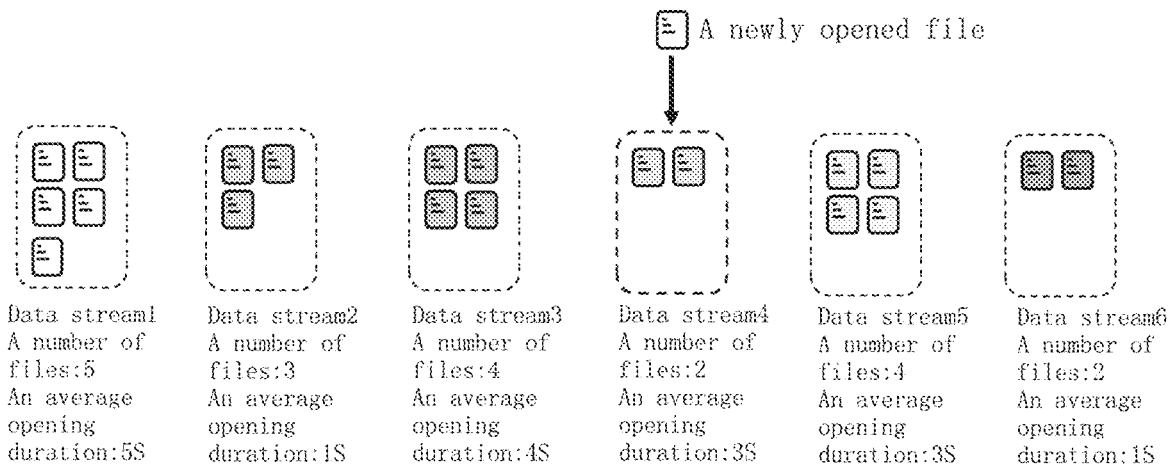
FIG. 2 illustrates a schematic diagram of distributing a file to a data stream of which a current state satisfies a first preset condition according to an exemplary embodiment.

FIG. 2 illustrates a schematic diagram of distributing a file to a data stream of which a current state satisfies a first preset condition according to an exemplary embodiment.

Referring to FIG. 2, data stream 1 has been distributed with 5 files at the current moment. Assuming that opening durations of these 5 files are 8S, 2S, 5S, 6S, 4S, the total opening duration of all files which are currently distributed to data stream 1 is 25S, and the average opening duration is 5S.

Alternatively, the current state information of the data streams includes at least one of the type of files which are currently distributed to the data streams, the number of files which are currently distributed to the data streams, the average opening duration of all files which are currently distributed to the data streams, and the total opening duration of all files which are currently distributed to the data streams.

Alternatively, the first preset condition may include at least one of the following conditions:

Condition 1: the type of files which are currently distributed to the data stream is the same as the type of the file to be distributed to data stream;

Condition 2: the number of files which are currently distributed to the data stream is the least;

Condition 3: the average opening duration of all files which are currently distributed to the data stream is the shortest;

Condition 4: the total opening duration of all files which are currently distributed to the data stream is the shortest;.

Condition 5: the number of times which files which are currently distributed to the data streams are modified is the least.

Alternatively, when at least two of the above conditions are selected, the priority of each condition may be preset.

As an example, condition 1 and condition 2 are selected to determine that the current state of the data stream satisfies the first preset condition, wherein the priority of condition 1 is higher than the priority of condition 2.

Taking FIG. 2 as an example, condition 2 is first used to select from data stream 1 to data stream 6, that is, the data stream in which the number of files currently distributed is the least is selected from data stream 1 to data stream 6, and data stream 4 and data stream 6 are selected according to condition 2.

Then condition 3 is used to select between data stream 4 and data stream 6, that is, the data stream in which the average opening duration of all files currently distributed is the shortest is selected from data stream 4 and data stream 6, and data stream 4 is selected according to condition 3, and it is determined that data stream 4 is the data stream of which the current state satisfies the first preset condition, and the newly opened file is distributed to data stream 4.

Alternatively, scores of the data streams may be calculated according to whether the current states of the data streams satisfy the various conditions, and the data stream with the highest score is regarded as the data stream of which the current state satisfies the first preset condition, and the newly opened file is distributed to the data stream with the highest score.

For example, a score value for each condition is pre-set. When the current states of the data streams satisfy a certain condition, the score value of the condition is assigned to the data streams; when the current states of the data streams do not satisfy the certain condition, the score values of the data streams are determined to be zero under the condition. The sum of the score values of the data streams under various conditions may be used as the scores of the data streams.

Alternatively, the score value of each condition may be determined depending on its importance. The higher the importance of the condition is, the higher the score is. For example, condition 1 has a score value of 40, condition 2 has a score value of 25, condition 3 has a score value of 20, and condition 4 has a score value of 15.

In an exemplary embodiment, after the data stream distribution is performed for a file when the file is opened, the data stream distribution may be performed for the file again using another method. Of course, there is no need to distribute the file to a data stream when the file is opened, but after the file has been opened for a period of time, the file may be distributed to a data stream using the another method. Thereafter, another method of distributing a file to a data stream is described.

Alternatively, step S110 may include: the attribute information of the file may be obtained at a preset time interval when the file is in an opening state, and step S120 may include: when the file is in the opening state, the file is distributed to a data stream of which a current state satisfies a second preset condition according to current state information of the data streams and attribute information of the file acquired up to current moment, at the preset time interval.

It is understandable if the file remains open for a period of time, operations such as creating, opening, modification, closing, deleting, etc., may occur, the attribute information of the file acquired in step S110 may change, more attribute information including the type and the opening time of the file may be acquired at each preset time interval. In step S120, the file may be distributed to a data stream according to the attribute information of the file acquired up to the current moment.

Alternatively, a starting moment for calculating the preset time interval may be determined according to needs, the starting moment may be the time when the file is opened, and also may be a certain moment after the file is opened, for example, the starting moment is a moment when the first data stream distribution for the file is complete or a certain moment after the first data stream distribution for the file is complete. It should be noted here that the first data stream distribution for the file refers to the process of distributing the file to a data stream when the file is opened as described above.

In the case that the starting moment for calculating the preset time interval is the time when the first data stream distribution for the file is complete or the moment after the first data stream distribution for the file is complete, in step S120, the file may be performed data stream distribution at least twice. The first data stream distribution for the file refers to "when the file is opened, according to the current state information of the data streams and the type of the file, the file is distributed to the data stream of with the current state satisfies the first preset condition" as described above, the second and subsequent data stream distribution for the file refers to "when the file is in the opening state, the file is distributed to a data stream of which a current state satisfies a second preset condition according to current state information of the data streams and attribute information of the file acquired up to current moment, at a preset time interval" as described above.

It can be understood that when the opening duration of the files starting from the starting moment is at least greater than the preset time interval, the file may be distributed to a data stream according to the attribute information of the file acquired up to the current moment.

For example, when the opening duration of the file starting from the starting moment is greater than 1 preset time interval and less than 2 preset time intervals, data stream distribution may be performed once for the file; specifically, when the first current moment reached after 1 preset time interval, the file may be distributed to a data stream, according to the current state information of the data streams and the attribute information of the file acquired up to the first current moment (that is, the attribute information of the file has been continuously acquired up to the first current moment).

When the opening duration of the file is greater than 2 preset time intervals and less than 3 preset time intervals, data stream distribution may be performed twice for the file. Specifically, when the second current moment reached after 2 preset time intervals starting from the moment when the first data stream distribution is performed for the file, the file may be distributed to a data stream, according to the current state information of the data stream and the attribute information of the file acquired up to the second current moment (that is, the attribute information of the file has been continuously acquired up to the second current moment).

Alternatively, the distributing the file to the data stream of which the current state satisfies the preset second conditions according to the current state information of the data streams and the attribute information of the file acquired up to the current moment, including: extracting a sub attribute set of the file in the obtained attribute information of the file, and distributing the file to the data stream of which the current state satisfies the second preset condition according to the current state information of the data streams and the sub attribute set of the file, wherein the sub attribute set may reflect access mode and/or data lifetime of the file.

As an example, the sub attribute set may include information on attributes such as opening, modification, closing, deleting, and type, etc. of the file.

Alternatively, the sub attribute set of the file is extracted in the obtained attribute information of the file, based on correlation analysis technology.

As an example, the correlation analysis technique may include techniques based on Pearson correlation coefficient, Kendall rank correlation coefficient, and the like.

It can be understood that, compared with the attribute information of the file obtained when the file is opened, the attribute information of the file obtained after at least one preset time interval is more complete. The sub attribute set that may reflect the access mode and/or data lifetime of the file may be extracted in these more complete attribute information, and the file is distributed to the data stream according to the sub attribute set, which is conducive to distributing files with similar characteristics (such as life cycle) to the same data stream.

Since the files with similar characteristics (such as life cycles) are distributed to the same data stream, after receiving the data stream identifier, the storage may store the files with very different characteristics in different memories or different areas of the same memory. The valid pages of garbage collection moving of the storage will be greatly reduced, thereby reducing WAF, improving the performance of the storage and extending the working life of the memory.

Alternatively, the current state information of the data streams includes corresponding relationships between the data streams and the category of the file, the data stream that satisfies the second preset condition refers to the data stream matches the category of the file. The distributing the file to the data stream of which the current state satisfies the second preset conditions according to the current state information of the data stream and the sub attribute set of the file, includes: classifying the file according to the sub attribute set of the file, determining the category to which the file currently belongs; distributing the file to the data stream corresponding to the category to which the file currently belongs.

Since the number of the data streams supported by the storage is limited, the number of categories of files may be determined according to the number of the data streams that the storage can support. It is understandable that the number of categories of files does not exceed the number of the data streams that the storage can support. Distributing files of the same category to the same data stream avoids to a large extent that files occupy too many data streams, and ensures that the number of occupied data streams does not exceed the number of data streams supported by the memory.

Alternatively, the file may be classified based on the sub attribute set of the file, using related clustering algorithms or reinforcement learning methods. As an example, the clustering algorithms may include k-means clustering algorithm, hierarchical clustering algorithm, and the like.

Figure 3:
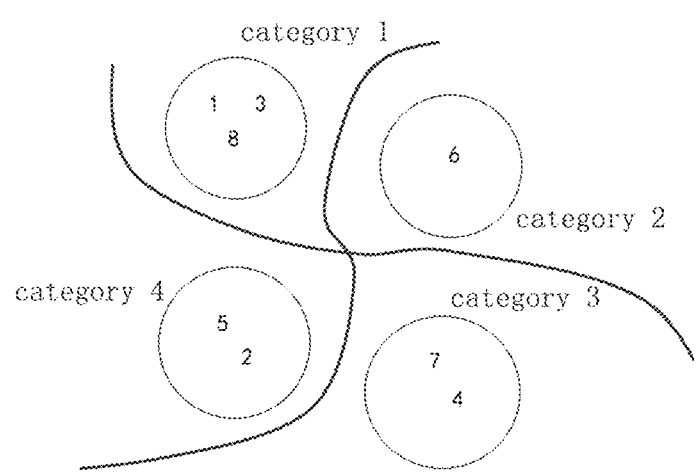
FIG. 3 illustrates a schematic diagram of classifying files according to an exemplary embodiment.

FIG. 3 illustrates a schematic diagram of classifying the file according to an exemplary embodiment.

As an example, referring to FIG. 3, numbers in circles in FIG. 3 may represent numbers of files (for example, the inode numbers). 8 files are classified into 4 categories, wherein the files with numbers 1, 3, and 8 belong to category 1, the file with number 6 belongs to category 2, the files with numbers 4 and 7 belong to category 3, and the files with numbers 2 and 5 belong to category 4. Different categories may correspond to different data streams, the files belonging to the same category have similar or same characteristics (such as life cycle), and the files in the same category may be distributed to the same data stream.

Alternatively, a plurality of data streams may include a first group of data streams and a second group of data streams. In other words, the plurality of data streams may be grouped in advance, for example, the plurality of data streams may be divided into the first group of data streams and the second group of data streams. When the file is distributed to a data stream according to the current state information of the data streams and the category of the file the file may be distributed to one data stream of the first group of data streams; when the file is distributed to a data stream according to the current state information of the data streams and the attribute information of the file acquired up to the current moment, the file may be distributed to one data stream in the second group of data streams.

For example, N data streams may be divided into two groups, data stream 1 to data stream S are the first group of data streams, and data stream S+1 to data stream N are the second group of data streams.

For the convenience of expression, "distributing the file to the data stream according to the current state information of the data streams and the attribute information of the file" is called a first manner of distributing the file to the data stream, and "distributing the file to the data stream according to the current state information of the data streams and the attribute information of the file acquired up to the current moment" is called a second manner of distributing the file to the data stream. It can be seen from the above content that the rules of the above two manners of distributing the file to the data stream are different. When distributing the file to the data stream by using the first manner, the file may be distributed to one data stream of the first group of data streams according to the rule of the first manner; when distributing the file to the data stream by using the second manner, the file may be distributed to one data stream of the second group of data streams according to the rule of the second manner. It should be noted that if the file may be distributed to the data stream at least twice, when the file is distributed to the data stream for the first time, the file may be distributed to one data stream of the first group of data streams by using the first manner, when the file is distributed to the data stream for the second time and subsequent times, the file may be distributed to one data stream of the second group of data streams by using the second manner. The two manners of distributing the file to the data stream correspond to two groups of data streams respectively, so that the files currently distributed to each group of data streams conform to the corresponding rules of the manners of distributing the file to the data stream, thereby avoiding the generation of mutual interference between the two manners when distributing the file to the data stream according to their respective rules. Alternatively, a number of data streams included in the first group of data streams and a number of data streams included in the second group of data streams may be adjusted in real time.

As an example, the number of data streams included in the first group of data streams and the number of data streams included in the second group of data streams are adjusted in real time, according to a number of files which have been distributed to the first group of data streams within a preset time and a number of files which have been distributed to the second group of data streams within the preset time.

It can be understood that, as time goes on, the number of the files which have been distributed to the first group of data streams within the preset time and the number of the files which have been distributed to the second group of data streams within the preset time. Therefore, the number of data streams included in the first group of data streams and the number of data streams included in the second group of data streams are adjusted in real time according to the above changes in numbers.

Alternatively, a ratio of the number of the files which have been distributed to the first group of data streams within the preset time to the number of the files which have been distributed to the second group of data streams within the preset time, and the number of data streams included in the first group of data streams and the number of data streams included in the second group of data streams may be adjusted according to the ratio. For example, a ratio of the number of the files which have been distributed to the first group of data streams in the last minute to the number of the files which have been distributed to the second group of data streams in the last minute, and the number of data streams included in the first group of data streams and the number of data streams included in the second group of data streams may be adjusted according to the ratio. For example, when the ratio becomes larger, the number of data streams included in the first group of data streams is increased, and the number of data streams included in the second group of data streams is reduced; when the ratio becomes smaller, the number of data streams included in the first group of data streams is reduced, and the number of data streams included in the second group of data streams is increased.

Of course, the number of data streams included in the first group of data streams and the number of data streams included in the second group of data streams may also be adjusted in other ways, which will not be listed here.

When the file is distributed to the data stream, the identifier of the data stream to which the file is distributed is transmitted to the operating system kernel, and the operating system kernel carries the identifier of the data stream when transmitting a write request (Write) to the memory, so that the identifier of the data stream is transmitted to the memory.

After the storage receives the identifier of the data stream, it may store or output the data of corresponding file based on the identifier of each data stream, and store the data of the files distributed to different data streams in different memories or different areas of the same memory. The valid pages of the garbage collection moving of the storage will be greatly reduced, thereby reducing WAF (Write Amplification Factor), improving the performance of the storage and extending the working life of the memory.

Alternatively, the storage may be SSD (Solid State Drives), ROM (Read-Only Memory), or other type of static storage apparatus that can store static information and instructions, may be RAM (Random Access Memory) or other type of dynamic storage apparatus that can store information and instructions, and may be EEPROM (Electrically Erasable Programmable Read Only Memory), CD-ROM (Compact Disc Read-Only Memory, read-only disc) or other optical disc memory, compact disc storage (including compact discs, laser discs, optical discs, digital versatile discs, Blu-ray discs, etc.), magnetic disk storage media or other magnetic storage apparatus, or any other medium that may be used to carry or store expected program codes with the form of instructions or data structures and may be accessed by a computer, but not limited thereto.

Alternatively, the identifier of the data stream to which the file is distributed may be submitted to the virtual file system in the operating system kernel first, and then is transferred through other layers in the operating system kernel in sequence, and finally is transmitted to the storage together with the write request.

Figure 5:
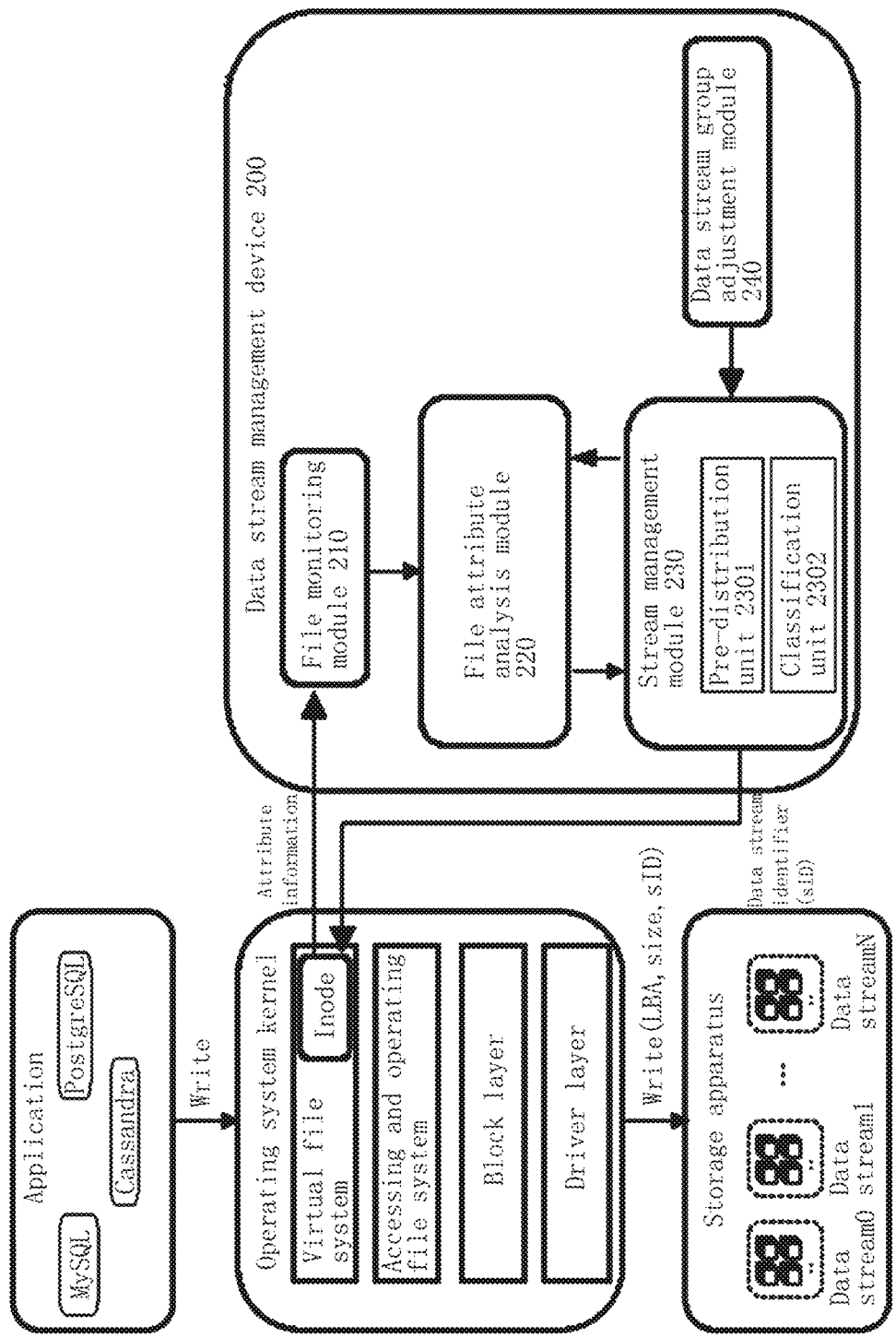
FIG. 5 illustrates a partial framework diagram of an operating system of an electronic apparatus according to an exemplary embodiment.

Taking the operating system as a Linux system as an example, referring to FIG. 5, the identifier of the data stream to which the file is distributed may be submitted to the virtual file system in the operating system kernel, and the identifier of the data stream is transferred to the accessing and operating file system (File System), the block layer (Block Layer) and the driver layer (Driver Layer) in the operating system kernel in sequence, and finally is transmitted to the storage together with the write request (Write).

Alternatively, the operating system is the Linux system, and transmitting the identifier of the data stream to which the file is distributed to the operating system kernel, includes:

When the Linux system is a first type version, transmitting the identifier of the data stream to which the file is distributed to the Linux system kernel through a first interface of the Linux system, wherein the first interface is obtained by pre-modifying the Linux system kernel; and/or When the Linux system is a second type version, transmitting the identifier of the data stream to which the file is distributed to the Linux system kernel through a second interface of the Linux system. Wherein the second interface has a function of receiving a identification of a data stream, for example, the second interface may be the fcntl interface (the file control interface).

Alternatively, the version below 4.13 of the Linux system may be regarded as the first type version and the version 4.13 and above of the Linux system may be regarded as the second type version.

As an example, when the Linux system is the second type version, the identifier of the data stream may be transferred to the Linux system kernel by calling the fcntl interface by using the write hint feature of the Linux system.

When transmits the identifier of the data stream to which the file is distributed to the operating system kernel according to the exemplary embodiment, it's not necessary to modify the code of the operating system kernel, or it's possible to make few changes to the code of the operating system kernel, which reduces changes to the operating system kernel.

Figure 4:
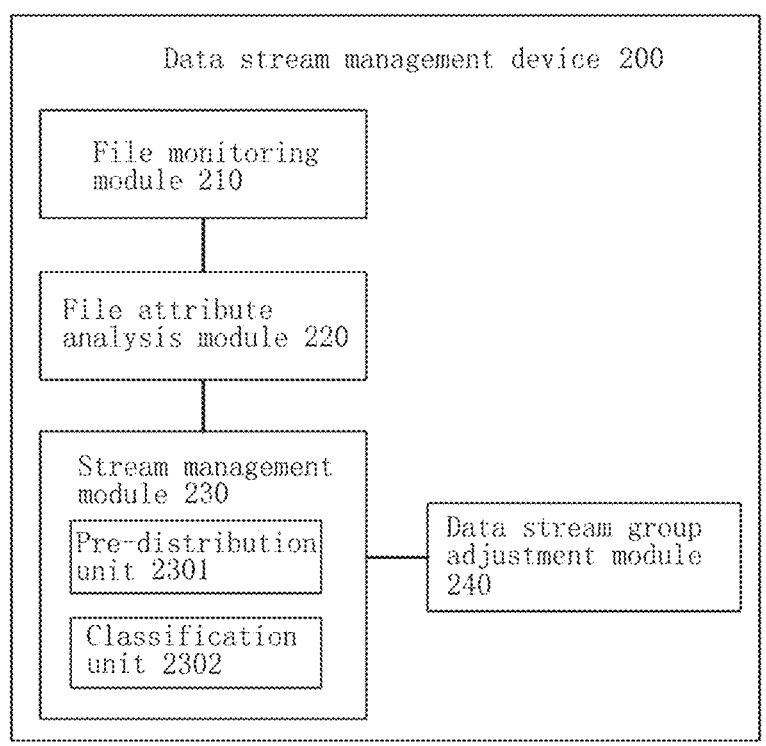
FIG. 4 illustrates a block diagram of a data stream management device according to an exemplary embodiment.

FIG. 4 illustrates a block diagram of a data stream management device 200 according to an exemplary embodiment of the present disclosure. The data stream management device 200 may be implemented by or in a controller of a storage device such as an SSD, or in a controller of an electronic device that also includes the storage device such as an SSD. In the data stream management device 200, functional units may be implemented by hardware, software, or a combination of hardware and software that implement the principles described herein. Those skilled in the art can understand that the functional units described in FIG. 4 may be combined together or divided into sub-units, to realize the principles described herein. Therefore, the description herein may support any possible combination, or division, or further limitation of the functional units described herein.

The functional units that the data stream management device 200 may have and the operations that may be performed by each functional unit are briefly described below. For the details involved, please refer to the above related description, which will not be repeated here.

Referring to FIG. 4, the data stream management device 200 according to an exemplary embodiment includes a file monitoring module 210 and a stream management module 230. The file monitoring module 210 and the stream management module 230 may be separately implemented by specific circuitry such as application specific integrated circuits (ASICs). Alternatively, file monitoring module 210 and the stream management module 230 may comprise software modules stored in a physical memory and executed by the same processor or different processors.

Before proceeding, it should be clear that FIGs. herein including FIG. 4 show and reference circuitry with labels such as "module". As is traditional in the field of the inventive concept(s) described herein, examples may be described and illustrated in terms of modules and blocks which carry out a described function or functions. These modules and blocks, which may be referred to herein as a file monitoring module and a stream management module or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The modules and blocks may, for example, be embodied in one or more semiconductor chips, or on substrate supports such as printed circuit boards and the like. The modules and blocks may be implemented by dedicated hardware, or by a processor (e.g., one or more programmed microprocessors and associated circuitry), or by a combination of dedicated hardware to perform some functions of the module or block and a processor to perform other functions of the module or block. Each module or block of the examples may be physically separated into two or more interacting and discrete modules or blocks without departing from the scope of the present disclosure. Likewise, the modules and blocks of the examples may be physically combined into more complex modules and blocks without departing from the scope of the present disclosure.

The file monitoring module 210 is configured to obtain attribute information of a currently opened file. The stream management module 230 is configured to distribute the file to a data stream according to current state information of data streams and the attribute information of the file. The currently opened file may be a file opened by an application running on an electronic device, and may involve writing data to and reading data from a storage device that stores data for the application. The data stream may refer to the stream of data being written to and read from the storage device.

Alternatively, the attribute information of the files includes a type of the file. The stream management module 230 includes a pre-distribution unit 2301. When the file is opened, the pre-distribution unit 2301 is configured to distribute the file to the data stream of which a current state satisfies a first preset condition, according to the current state information of the data streams and the type of the file.

Alternatively, the current state information includes at least one of a type of files which are currently distributed to the data streams, a number of the files which are currently distributed to the data streams; opening duration information of the files which are currently distributed to the data streams; and a number of times by which the files which are currently distributed to the data streams are modified. The opening duration information may be information of how long each file has been open.

Alternatively, the opening duration information of the files with which the data streams are currently distributed includes at least one of an average opening duration of all files which are currently distributed to the data streams; and the total opening duration of all files which are currently distributed to the data streams.

Alternatively, the first preset condition includes at least one of the type of the files which are currently distributed to the data stream being the same as the type of the file to be distributed to the data stream, the number of the files which are currently distributed to the data stream being the smallest; the average opening duration of all files which are currently distributed to the data stream being the shortest; the total opening duration of all files which are currently distributed to the data stream being the shortest; and the number of times by which the files which are currently distributed to the data streams are modified being the least.

Alternatively, the stream management module 230 includes a classification unit 2302. When the file is in an opening state, the classification unit 2302 is configured to distribute the file to a data stream of which the current state satisfies a second preset condition according to the current state information of the data streams and the attribute information of the file acquired up to current moment, at a preset time interval.

Alternatively, the data stream management device 200 further includes a file attribute analysis module 220. The file attribute analysis module 220 is configured to extract a sub attribute set of the file in the obtained attribute information of the file. The sub attribute set may reflect access mode and/or data lifetime of the file.

The classification unit 2302 is configured to distribute the file to the data stream of which the current state satisfies the second preset condition according to the current state information of the data streams and the sub attribute set of the file.

The file attribute analysis module 220 may maintain a file attribute table. As described above, the obtained attribute information of the currently opened file may be stored in the file attribute table, and the file attribute analysis module 220 may extract the sub attribute set of the file in the file attribute table.

Alternatively, the current state information includes corresponding relationships between the data streams and the category of the file. The data stream that satisfies the second preset condition may be the data stream that matches the category of the file. The classification unit 2302 is configured to classify the file according to the sub attribute set of the file, determine the category to which the file currently belongs, and distribute the file to the data stream corresponding to the category to which the file currently belongs.

Alternatively, a plurality of data streams may comprise a first group of data streams and a second group of data streams. When distributing the file to the data stream according to the current state information of the data streams and the category of the file, the pre-distribution unit 2301 is configured to distribute the file to one data stream in the first group of data streams. When distributing the file to the data stream according to the current state information of the data streams and the attribute information of the file acquired up to the current moment, the classification unit 2302 is configured to distribute the file to one data stream in the second group of data streams.

Alternatively, the data stream management device 200 further includes a data stream group adjustment module 240. The data stream group adjustment module 240 is configured to adjust a number of data streams included in the first group of data streams and a number of data streams included in the second group of data streams in real time, according to a number of files which have been distributed to the first group of data streams within a preset time and a number of files which have been distributed to the second group of data streams within the preset time.

Alternatively, the data stream group adjustment module 240 is configured to: calculate a ratio of the number of the files which have been distributed to the first group of data streams within the preset time to the number of the files which have been distributed to the second group of data streams within the preset time; and adjust the number of data streams included in the first group of data streams and the number of data streams included in the second group of data streams in real time according to the ratio.

Alternatively, the operating system is a Linux system, and the stream management module 230 is configured to: transmit an identifier of the data stream to which the file is distributed to the Linux system kernel through a first interface of the Linux system when the Linux system is a first type version, wherein the first interface is obtained by pre-modifying the Linux system kernel; and/or transmit the identifier of the data stream to which the file is distributed to the Linux system kernel through a second interface of the Linux system when the Linux system is a second type version.

FIG. 5 illustrates a partial framework diagram of an operating system of an electronic device according to an exemplary embodiment. It should be noted here that the storage device in FIG. 5 is a physical device and does not belong to an operating system. The storage device in FIG. 5 includes at least one memory, and the storage may be an SSD. Referring to FIG. 5, applications for executing files are deployed in the operating system. The applications may include MySQL, PostgreSQL, and Cassandra, and may also include RocksDB, MongoDB, or Docker, etc.

The storage device in FIG. 5 may include an SSD that includes a memory comprising the storage apparatus and a controller comprising the data stream management device 200. The memory comprising the storage apparatus may be configured to store written data logically arranged in accordance with multiple data streams. For example, each data stream may be written to dedicated memory areas that are logically and/or physically separated from memory areas dedicated to the other data streams. The controller comprising the data stream management device 200 may be configured to obtain attribute information of a currently opened file, and to distribute the file to a data stream according to current state information of the plurality of data streams and the attribute information of the file.

In some embodiments, a controller that includes the data stream management device 200 may be provided in a memory system that includes multiple SSDs. In other embodiments, the controller that includes the data stream management device 200 may be provided in a host connected to one or more SSDs.

Referring to FIG. 5, a workflow of the data stream management device 200 includes:

(a) The file monitoring module 210 calls the inotify tool provided by the Linux kernel to monitor all currently opened files, and continuously obtains attribute information (such as file path, type, opening time, times of modification, etc.) of each file from the inode corresponding to the file.

(b) The file attribute analysis module 220 summarizes and stores the file attribute obtained by the file monitoring module 210 in the file attribute table, and extracts the sub attribute set that may reflect the access mode and the data lifetime of the files from the file attribute table, based on the Pearson correlation coefficient.

(c) The pre-distribution unit 2301 occupies data stream 1 to data stream S, and is in charge of performing data stream distribution for the newly opened file for the first time. When one file is opened, the pre-distribution unit 2301 will distribute an identifier of a data stream to the file for the first time according to the file attribute (such as the type and opening time) and current usage states of the streams (for example, distribute a file to the stream in which the distributed files are least and the average opening time of the distributed files is the longest), thereby distributing the files managed by the pre-distribution unit 2301 to different data streams as far as possible.

(d) The classification unit 2302 occupies data stream S+1 to data stream N, and is in charge of performing the data stream distribution again for the files which have been opened for a long while. After the files are written for a period of time, the file attribute analysis module 220 may extract sub attribute sets that may reflect the access modes and data lifetimes of the files (for example, the times of modification of the files, etc.). For the files which have not been currently closed yet, the classification unit 2302 clusters these files based on the extracted sub attribute sets of the files for every T seconds, using the k-means clustering algorithm, and each type of the files is distributed into the corresponding data stream.

It can be understood that the files which have been opened for a long while may be the files which have not been closed for a preset time interval starting from the starting moment as described above.

(e) The data stream group adjustment module 240 dynamically adjusts a value of S, according to a ratio of a number of files managed by the pre-distribution unit 2301 to a number of files managed by the classification unit 2302.

The number of files managed by the pre-distribution unit 2301 may be the number of the files which have been distributed to the first group of data streams within the preset time; the number of files managed by the classification unit 2302 may be the number of the files which have been distributed to the second group of data streams within the preset time.

It can be understood that dynamically adjusting the value of S is actually to adjust the number of data streams included in the first group of data streams and the number of data streams included in the second group of data streams in real time as described above.

(f) The pre-distribution unit 2301 and/or the classification unit 2302 transfers the identifier of the data stream to which the file is distributed to the SSD through the interface (for example, the fcntl interface) provided by the operating system kernel.

Referring to FIG. 5, the identifier of the data stream to which the file is distributed may be first submitted to the virtual file system in the operating system kernel through the interface provided by the operating system kernel (through the fcntl interface).The identifier of the data stream is transferred to the accessing and operating file system (File System), the block layer (Block Layer) and the driver layer (Driver Layer) in the operating system kernel in sequence, and finally the identifier of the data stream is transmitted to the storage together with a write request (Write).

The storage receives the identifier of the data stream, may store or output data of corresponding files based on the identifier of each data stream, store the data of the files distributed to different data streams in different memories or different areas of the same memory. The valid pages of garbage collection moving will be greatly reduced, thereby reducing WAF of the memory, improving the performance of the storage and extending the working life of the memory.

FIG. 6 illustrates a block diagram of a computing device according to an exemplary embodiment.

Referring to FIG. 6, an exemplary embodiment further provides a computing device 300, and the computing device 300 includes a processor 310 and a memory 320. The memory 320 stores computer programs, and when the computer programs are executed by the processor 310, the above data stream management method is implemented.

The processor 310 may be a CPU (Central Processing Unit), a general-purpose processor, a DSP (Digital Signal Processor), an ASIC (Application Specific Integrated Circuit), an FPGA (Field-Programmable Gate Array) or other programmable logic device, transistor logic device, hardware component, or any combination thereof. It may implement or execute various exemplary logical blocks, modules and circuits described in conjunction with the disclosure of this application. The processor 310 may also be a combination that implements computing functions, for example, including a combination of one or more microprocessors, a combination of a DSP and a microprocessor, and so on.

The memory 320 may be a ROM (read only memory) or other type of static storage apparatus that may store static information and instructions, may be a RAM (random access memory) or other type of dynamic storage apparatus that may store information and instructions, may also be EEPROM (electrically erasable programmable read only memory, CD-ROM (compact disc read-only memory or other optical disc memory, compact disc memory (including compact disc, laser disc, optical disc, digital versatile disc, Blu-ray disc, etc.), magnetic disk memory media or other magnetic memory apparatus, or any other medium that may be used to carry or store expected program codes with the form of instructions or data structures and may be accessed by a computer, but not limited thereto.

Some exemplary embodiments according to the present disclosure also provide a computer-readable storage medium storing computer programs, wherein the computer programs when executed by at least one computing device, cause the at least one computing device to perform the above data stream management method.

The computer-readable recording medium is any data storage device that may store data read by a computer system. Examples of computer-readable recording media include read-only memory, random access memory, read-only optical disk, magnetic tape, floppy disk, optical data storage device, and carrier wave (such as data transmission through the Internet via wired or wireless transmission path).

As set forth above, according to a data stream management method of an exemplary embodiment, based on the characteristic of data being managed in a file format, each file is automatically distributed to the corresponding data stream depending on the attribute information of the files, the attribute information of the files may be directly acquired in a virtual file system of an operating system kernel, that is, there is no need to modify code of the operating system kernel, and there is no need to modify code of an application. And, the data stream management method can also effectively realize the separation of data of different life cycles.

Alternatively, the attribute information of the file includes a type of the file; the distributing the file to the data stream according to the current state information of the data streams and the attribute information of the file, comprises: when the file is opened, distributing the file to the data stream whose current state satisfies a first preset condition according to the current state information of the data streams and the type of the file.

According to the data stream management method of an exemplary embodiment, data stream distribution is completed once immediately when the file is opened, and the optimization effect of the data stream distribution may be guaranteed in time.

Alternatively, the current state information includes at least one of: a type of files which are currently distributed to the data streams; a number of the files which are currently distributed to the data streams; opening duration information of the files which are currently distributed to the data streams; a number of times by which the files which are currently distributed to the data streams are modified.

According to the data stream management method of an exemplary embodiment, the type of the files which are currently distributed to the data streams is used as a basis for distributing the file to the data stream, which may increase a probability of distributing files of the same type to one data stream. At least one of the number of the files which are currently distributed to the data streams, the opening duration information of the files which are currently distributed to the data streams, and the number of times by which the files which are currently distributed to the data streams are modified is used as a basis for distributing the data stream, which may balance data volumes of respective data streams, so that the data volumes of the respective data streams remain consistent to a large extent.

Alternatively, the opening duration information of the files which are currently distributed to the data streams includes at least one of: an average opening duration of all files which are currently distributed to the data streams; a total opening duration of all files which are currently distributed to the data streams.

Alternatively, the first preset condition includes at least one of the following conditions: the type of the files which are currently distributed to the data streams is the same as the type of the file to be distributed to the data stream; the number of the files which are currently distributed to the data streams is the least; the average open duration of all files which are currently distributed to the data streams is the shortest; the total opening duration of all files which are currently distributed to the data streams is the shortest; and the number of times by which the files which the data streams are modified is the least.

Alternatively, the distributing the file to the data stream according to the current state information of the data streams and the attribute information of the file, includes: when the file is in an opening state, distributing the file to a data stream whose current state satisfies a second preset condition according to the current state information of the data streams and the attribute information of the file acquired up to current moment, at a preset time interval.

According to the data stream management method of the exemplary embodiment, after the file is opened, the attribute information of the file obtained after at least one preset time interval is more complete, and the sub attribute set that may reflect the access mode and/or data lifetime of the file may be extracted in these more complete attribute information. Distributing the data stream for the file according to the sub attribute set is beneficial to distributing the file with similar characteristics (such as life cycles) to the same data stream.

Since files with similar characteristics (such as life cycles) are distributed to the same data stream, after the identifier of the data stream is received by the memory, the files with very different characteristics may be stored in different memories or different areas of the same memory. The valid pages of garbage collection moving of the storage will be greatly reduced, thereby reducing WAF, improving the performance of the storage and extending the working life of the memory.

Alternatively, distributing the file to the data stream whose current state satisfies the first preset condition according to the current state information of the data streams and the attribute information of the file acquired up to the current moment, includes: extracting a sub attribute set of the file in the obtained attribute information of the file, wherein the sub attribute set is capable of reflecting an access mode and/or a data lifetime of the file; distributing the file to the data stream whose current state satisfies the second preset conditions according to the current state information of the data streams and the sub attribute set of the file.

Alternatively, the current state information includes corresponding relationships between the data streams and categories of the files. The data stream that satisfies the second preset condition may be the data stream that matches the category of the file. The distributing the file to the data stream whose current state satisfies the second preset condition according to the current state information of the data streams and the sub attribute set of the file may include classifying the file according to the sub attribute set of the file, determining a category to which the file currently belongs, and distributing the file to the data stream corresponding to the category to which the file currently belongs.

According to the data stream management method of the exemplary embodiment, files in the same category are distributed to the same data stream, which avoids to a large extent that the files occupy too much data stream, and ensures that the number of the data streams occupied does not exceed the number of data streams that the storage can support.

Alternatively, a plurality of data streams comprise a first group of data streams and a second group of data streams; the method further includes: when distributing the file to the data stream according to the current state information of the data streams and the category of the file, distributing the file to one data stream in the first group of data streams; when distributing the file to the data stream according to the current state information of the data streams and the attribute information of the file acquired up to the current moment, distributing the file to one data stream in the second group of data streams.

According to the data stream management method of the exemplary embodiment, two manners of distributing the file to the data stream are provided, and the two manners of distributing the file to the data stream correspond to two groups of data streams respectively, so that the files that are currently distributed to each group of data streams conform to the corresponding rule of the manner of distributing the file to data stream, thereby avoiding the generation of mutual interference of the two manners of distributing the file to data stream when distributing the data stream for the files according to their respective rules.

Alternatively, the method further includes: adjusting a number of data streams included in the first group of data streams and a number of data streams included in the second group of data streams in real time, according to a number of files which have been distributed to the first group of data streams within a preset time and a number of files which have been distributed to the second group of data streams within the preset time.

Alternatively, the adjusting the number of data streams included in the first group of data streams and the number of data streams included in the second group of data streams in real time, according to the number of the files which have been distributed to the first group of data streams within the preset time and the number of the files which have been distributed to the second group of data streams within the preset time, includes: calculating a ratio of the number of the files which have been distributed to the first group of data streams within the preset time to the number of the files which have been distributed to the second group of data streams within the preset time; and adjusting the number of data streams included in the first group of data streams and the number of data streams included in the second group of data streams in real time according to the ratio.

Alternatively, the attribute information of the file comprises a type of the file; the stream management module includes a pre-distribution unit configured to: when the file is opened, distribute the file to the data stream whose current state satisfies a first preset condition according to the current state information of the data streams and the type of the file.

Alternatively, the current state information includes at least one of a type of files which are currently distributed to the data streams; a number of the files which are currently distributed to the data streams; opening duration information of the files which are currently distributed to the data streams; and a number of times by which the files which are currently distributed to the data streams are modified.

Alternatively, the opening duration information of the files which are currently distributed to the data streams includes at least one of: an average opening duration of all files which are currently distributed to the data streams; a total opening duration of all files which are currently distributed to the data streams.

Alternatively, the first preset condition includes at least one of the following conditions: the type of the files which are currently distributed to the data streams is the same as the type of the file to be distributed to the data stream; the number of the files which are currently distributed to the data streams is the least; the average open duration of all files which are currently distributed to the data streams is the shortest; the total opening duration of all files which are currently distributed to the data streams is the shortest; and the number of times by which the files which are currently distributed to the data streams are modified is the least.

Alternatively, the stream management module includes a classification unit configured to: when the file is in an opening state, distribute the file to a data stream whose current state satisfies a second preset condition according to the current state information of the data streams and the attribute information of the file acquired up to current moment, at a preset time interval.

Alternatively, the device further includes a file attribute analysis module configured to: extract a sub attribute set of the file in the obtained attribute information of the file, wherein the sub attribute set is capable of reflecting an access mode and/or a data lifetime of the file; the classification unit is configured to distribute the file to the data stream whose current state satisfies the second preset condition according to the current state information of the data streams and the sub attribute set of the file.

The classification unit is configured to extract the sub attribute set of the file in the acquired attribute information of the file, wherein the sub attribute set is capable of reflecting an access mode and/or a data lifetime of the file; distribute the file to the data stream whose current state satisfies the second preset conditions according to the current state information of the data streams and the sub attribute set of the file.

Alternatively, the current state information includes corresponding relationships between the data streams and the categories of the files. The data stream that satisfies the second preset condition may be the data stream that matches the category of the file. The classification unit may be configured to classify the file according to the sub attribute set of the file, determine a category to which the file currently belongs, and distribute the file to the data stream corresponding to the category to which the file currently belongs.

Alternatively, a plurality of data streams include a first group of data streams and a second group of data streams; the pre-distribution unit is configured to: when the file to distribute the data stream according to the current state information of the data streams and the category of the file, distribute the file to one data stream in a first group of data streams; the classification unit is configured to: when the file to distribute the data stream for the file according to the current state information of the data streams and the attribute information of the file acquired up to the current moment, distribute the files to one data stream in a second group of data streams.

Alternatively, the device further includes a data stream group adjustment module configured to: adjust a number of data streams included in the first group of data streams and a number of data streams included in the second group of data streams in real time, according to a number of files which have been distributed to the first group of data streams within a preset time and a number of files which have been distributed to the second group of data streams within the preset time.

Alternatively, the data stream group adjustment module is configured to: calculate a ratio of the number of the files which have been distributed to the first group of data streams within the preset time to the number of the files which have been distributed to the second group of data streams within the preset time; adjust the number of data streams included in the first group of data streams and the number of data streams included in the second group of data streams in real time according to the ratio.

According to another aspect of the present disclosure as described above, a computing device includes a processor and a memory storing computer programs, and the computer programs, when executed by the processor, implement the above data stream management methods.

According to yet another aspect of the present disclosure described above, a computer-readable storage medium stores computer programs. The computer programs, when executed by at least one computing device, cause the at least one computing device to execute data stream management methods described herein.

Various exemplary embodiments of the present application are described above, and it should be understood that the above description is only exemplary and not exhaustive, and the present application is not limited to the disclosed various exemplary embodiments. Without departing from the scope and spirit of the application, many modifications and changes in form and details may be made. Therefore, the protection scope of this application should be subject to the scope of the claims.

What is claimed is:

1. A data stream management method, comprising:
    obtaining attribute information of a currently opened file;
    extracting a sub attribute set of the file, wherein the sub attribute set is capable of reflecting an access mode and/or a data lifetime of the file; and
    distributing the file to a data stream according to current state information of data streams and the attribute information of the file including the sub attribute set of the file by distributing, when the file is opened, the file to the data stream whose current state satisfies a first preset condition according to the current state information of the data streams, wherein the first preset condition comprises at least one of the following conditions:
    a type of the files which are currently distributed to the data streams is the same as the type of the file to be distributed to the data stream;
    a number of the files which are currently distributed to the data streams is the least;
    an average open duration of all files which are currently distributed to the data streams is the shortest;
    a total opening duration of all files which are currently distributed to the data streams is the shortest; and
    a number of times which the files which are currently distributed to the data streams are modified is the least.

2. The data stream management method of claim 1, wherein the attribute information of the file comprises a type of the files; and
    the distributing the file to the data stream according to the current state information of the data streams and the attribute information of the file, comprises:
    distributing, when the file is opened, the file to the data stream whose current state satisfies-a the first preset condition according to the current state information of the data streams and the type of the file.

3. The data stream management method of claim 1, wherein the current state information comprises at least one of:
- a type of files which are currently distributed to the data streams;
- a number of the files which are currently distributed to the data streams; and
- a number of times by which the files which are currently distributed to the data streams are modified.

4. The data stream management method of claim 2, wherein the current state information comprises opening duration information of the files which are currently distributed to the data streams; and the opening duration information of the files which are currently distributed to the data streams comprises at least one of:
- an average opening duration of all files which are currently distributed to the data streams; and
- a total opening duration of all files which are currently distributed to the data streams.

5. The data stream management method of claim 2, wherein the distributing the file to the data stream according to the current state information of the data streams and the attribute information of the files, comprises:
- distributing, when the file is in an opening state, the file to a data stream whose current state satisfies a second preset condition according to the current state information of the data streams and the attribute information of the file acquired up to current moment, at a preset time interval.

6. The data stream management method of claim 5, wherein the distributing the file to the data stream whose current state satisfies the second preset condition according to the current state information of the data streams and the attribute information of the file acquired up to the current moment, comprises:
- extracting the sub attribute set of the file in the obtained attribute information of the file; and
- distributing the file to the data stream whose current state satisfies the second preset condition according to the current state information of the data streams and the sub attribute set of the file.

7. The data stream management method of claim 5, wherein,
- a plurality of data streams comprise a first group of data streams and a second group of data streams; and
- the data stream management method further comprises:
- when distributing the file to the data stream according to the current state information of the data streams and a type of the file, distributing the file to one data stream in the first group of data streams; and
- when distributing the file to the data stream according to the current state information of the when distributing the file to the data stream according to the current state information of the data stream and the attribute information of the file acquired up to the current moment, distributing the file to one data stream in the second group of data streams.

8. A data stream management device, comprising:
- a file monitoring module configured to obtain attribute information of a currently opened file;
- a file attribute analysis module configured to extract a sub attribute set of the file in the attribute information of the file, wherein the sub attribute set is capable of reflecting an access mode and/or a data lifetime of the file; and
- a stream management module configured to distribute the file to a data stream according to current state information of data streams and the attribute information of the file including the sub attribute set of the file by distributing, when the file is opened, the file to the data stream whose current state satisfies a first preset condition according to the current state information of the data streams, wherein the first preset condition comprises at least one of the following conditions:
- a type of the files which are currently distributed to the data streams is the same as the type of the file to be distributed to the data stream;
- a number of the files which are currently distributed to the data streams is the least;
- an average open duration of all files which are currently distributed to the data streams is the shortest;
- a total opening duration of all files which are currently distributed to the data streams is the shortest; and
- a number of times which the files which are currently distributed to the data streams are modified is the least.

9. The data stream management device of claim 8,
- wherein the attribute information of the file comprises a type of the file; and
- the stream management module comprises a pre-distribution unit configured to:
- distribute, when the file is opened, the file to the data stream whose current state satisfies the first preset condition according to the current state information of the data streams and the type of the file.

10. The data stream management device of claim 9, wherein the current state information comprises at least one of:
- a type of files which are currently distributed to the data streams;
- a number of the files which are currently distributed to the data streams; and
- a number of times by which the files which are currently distributed to the data streams are modified.

11. The data stream management device of claim 8,
- wherein the current state information comprises opening duration information of the files which are currently distributed to the data streams, and the opening duration information of the files which are currently distributed to the data streams comprises at least one of:
- an average opening duration of all files which are currently distributed to the data streams; and
- a total opening duration of all files which are currently distributed to the data streams.

12. The data stream management device of claim 8, wherein the stream management module includes a classification unit configured to:
- when the file is in an opening state, distribute the file to a data stream whose current state satisfies a second preset condition according to the current state information of the data streams and the attribute information of the file acquired up to current moment, at a preset time interval.

13. The data stream management device of claim 12, wherein the device further comprises a file attribute analysis module configured to: extract the sub attribute set of the file in the obtained attribute information of the file; and
- the classification unit is configured to distribute the file to the data stream whose current state satisfies the second preset condition according to the current state information of the data streams and the sub attribute set of the file.

14. The data stream management device of claim 12, wherein, a plurality of data streams comprise a first group of data streams and a second group of data streams;
- the stream management module comprises a pre-distribution unit configured to: when distributing the file to the data stream according to the current state information of the data streams and a category of the file, distribute the file to one data stream in the first group of data streams;
- the classification unit is configured to: when distributing the file to the data stream according to the current state information of the data stream and the attribute information of the file acquired up to the current moment, distribute the file to one data stream in the second group of data streams.

15. A storage device, comprising:
- a memory configured to store written data logically arranged in accordance with a plurality of data streams; and
- a data stream management device configured to obtain attribute information of a currently opened-file, file; to extract a sub attribute set of the file, wherein the sub attribute set is capable of reflecting an access mode and/or a data lifetime of the file; and to distribute the file to a data stream according to current state information of the plurality of data streams and the attribute information of the file by distributing, when the file is opened, the file to the data stream whose current state satisfies a first preset condition according to the current state information of the data streams, wherein the first preset condition comprises at least one of the following conditions:
  - a type of the files which are currently distributed to the data streams is the same as the type of the file to be distributed to the data stream;
  - a number of the files which are currently distributed to the data streams is the least;
  - an average open duration of all files which are currently distributed to the data streams is the shortest;
  - a total opening duration of all files which are currently distributed to the data streams is the shortest; and
  - a number of times which the files which are currently distributed to the data streams are modified is the least.

16. The storage device of claim 15, wherein the attribute information of the file comprises a type of the files; and
- the data stream management device is configured to distribute the file to the data stream according to the current state information of the data streams and the attribute information of the file by distributing, when the file is opened, the file to the data stream whose current state satisfies the first preset condition according to the current state information of the data streams and the type of the file.

17. The storage device of claim 16,
- wherein the current state information comprises opening duration information of the files which are currently distributed to the data streams; and
- the opening duration information of the files which are currently distributed to the data streams comprises at least one of:
  - an average opening duration of all files which are currently distributed to the data streams; and
  - a total opening duration of all files which are currently distributed to the data streams.

\* \* \* \* \*